March 17, 1964  C. E. HERRICK, JR., ET AL  3,125,013
APPARATUS FOR REFLEX COPYING BY THE USE OF FIBER OPTICAL DEVICES
Filed Dec. 7, 1959  10 Sheets-Sheet 1

INVENTORS
CLIFFORD E. HERRICK, JR.
JOHN W. WEIGL
BY
ATTORNEYS

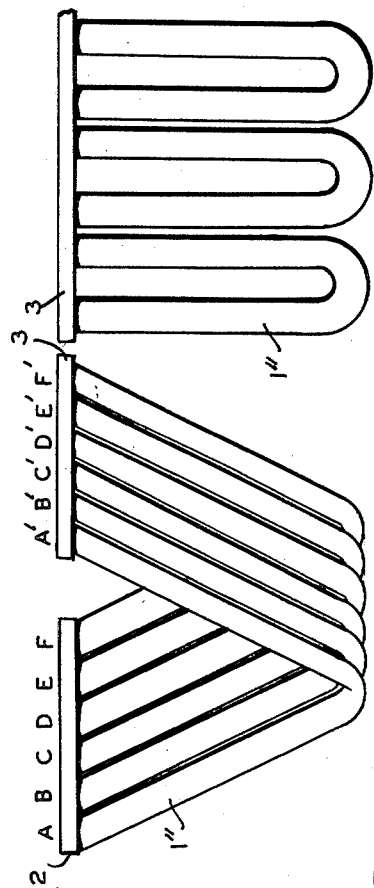
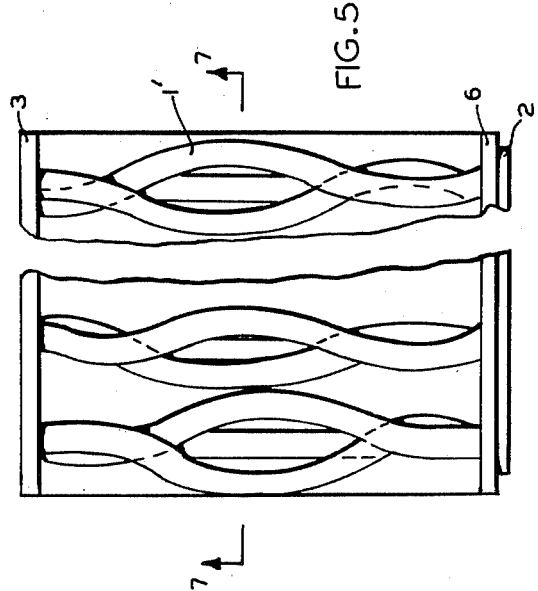
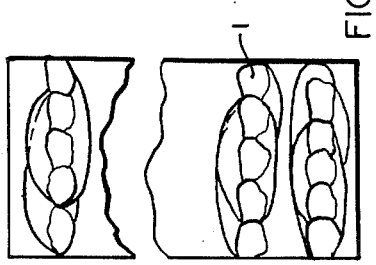
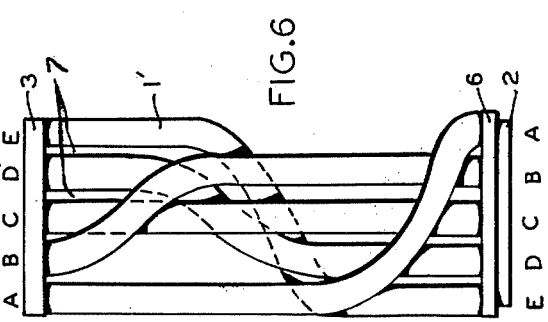
INVENTORS
CLIFFORD E. HERRICK, JR.
JOHN W. WEIGL
BY
ATTORNEYS

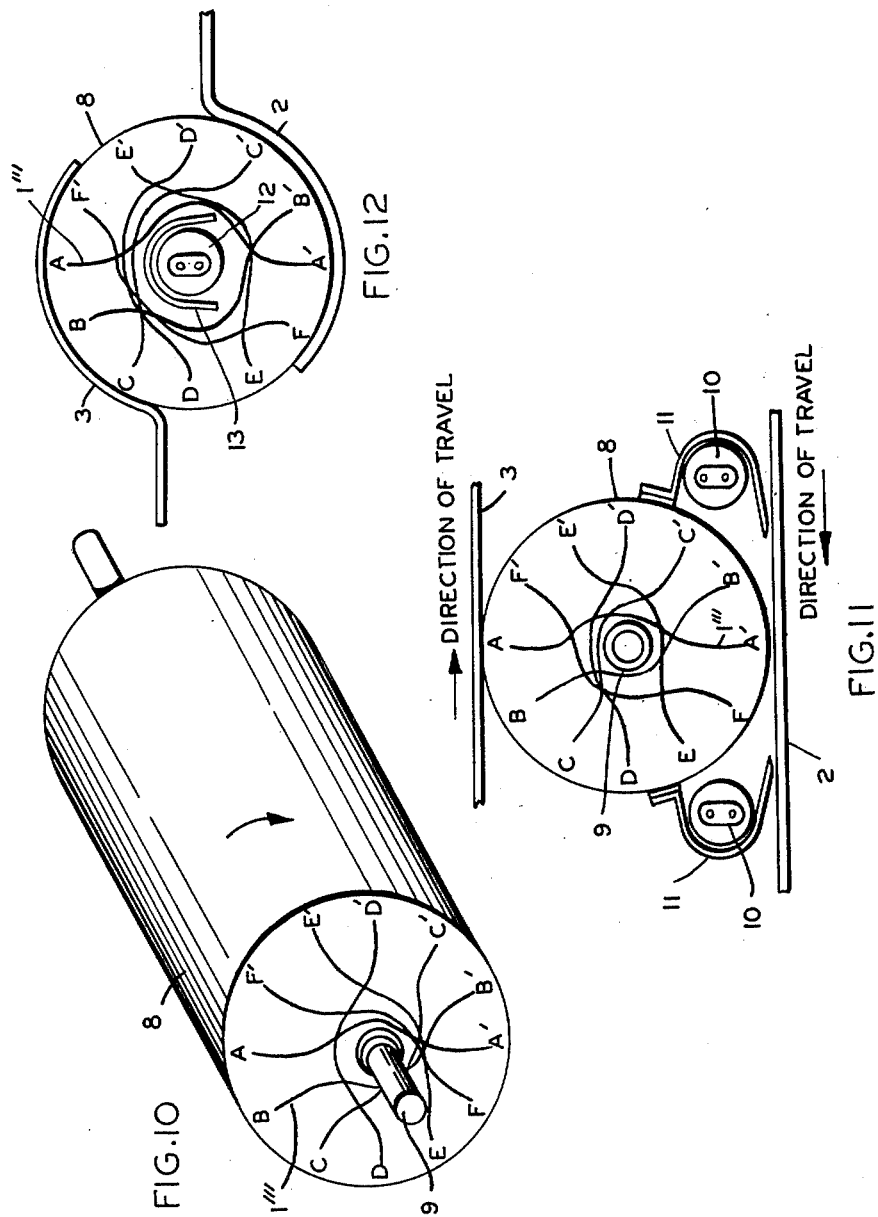

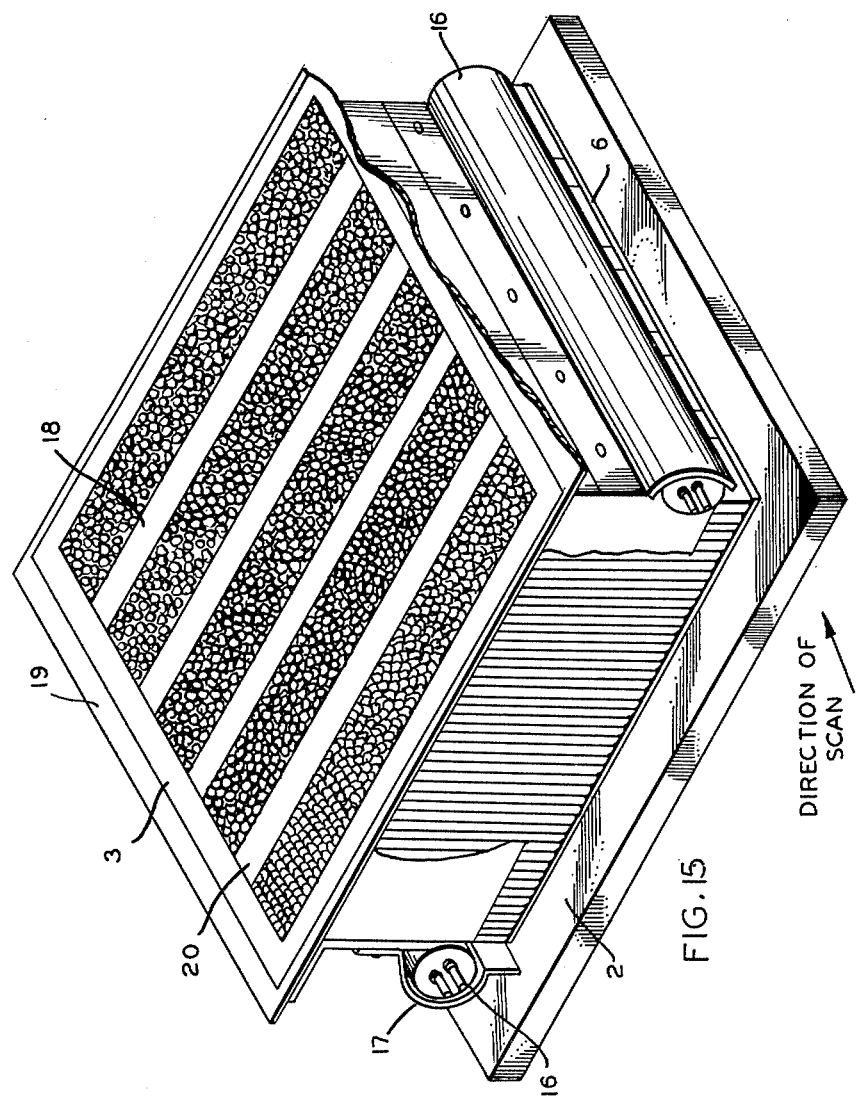

March 17, 1964  C. E. HERRICK, JR., ETAL  3,125,013
APPARATUS FOR REFLEX COPYING BY THE USE OF FIBER OPTICAL DEVICES
Filed Dec. 7, 1959  10 Sheets-Sheet 6
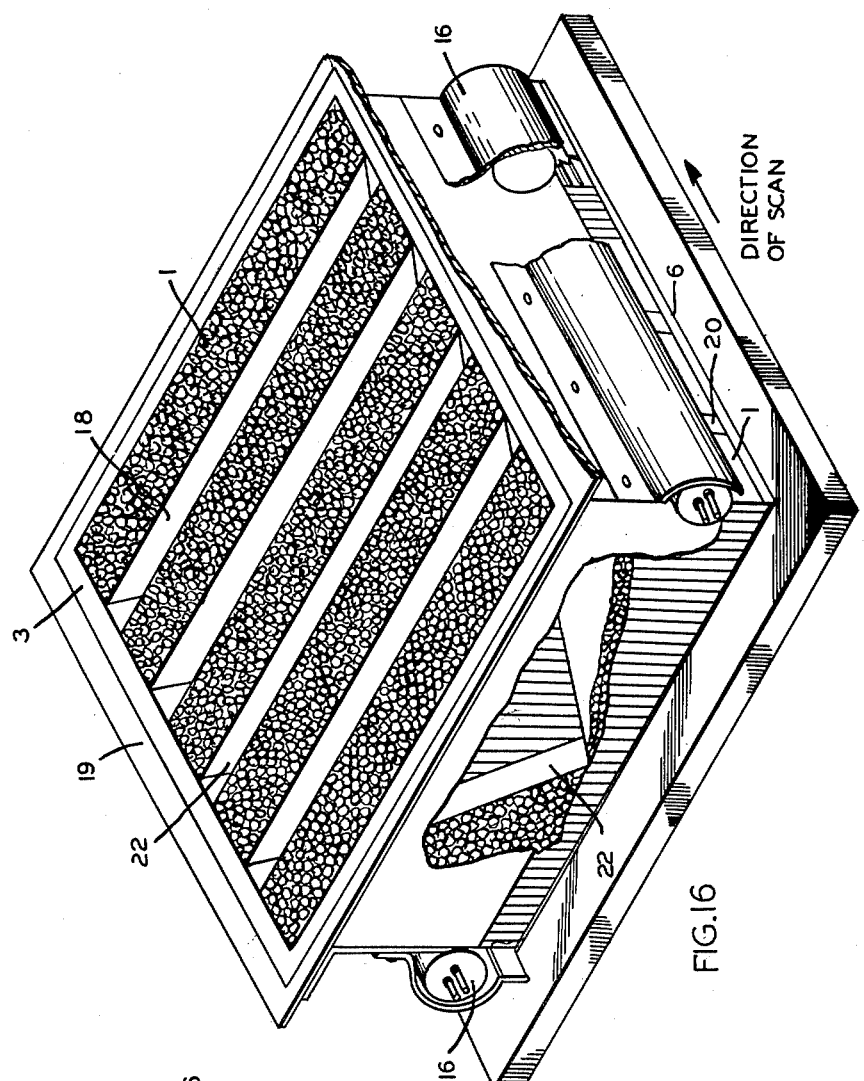
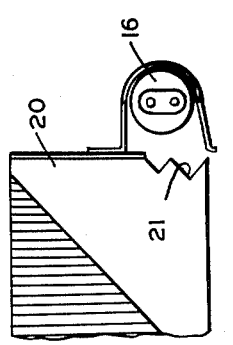
INVENTORS
CLIFFORD E. HERRICK, JR.
JOHN W. WEIGL
BY
ATTORNEYS

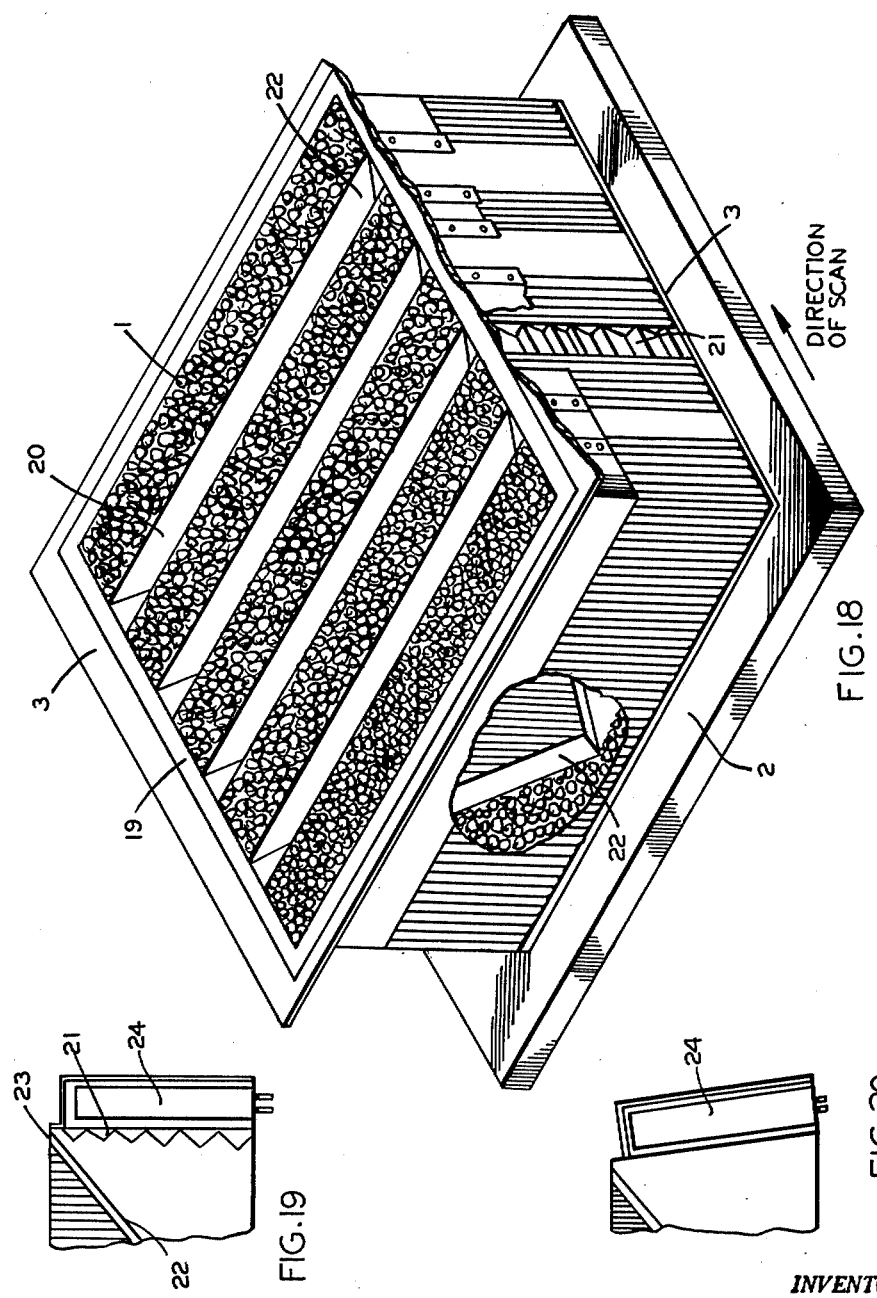

March 17, 1964  C. E. HERRICK, JR., ETAL  3,125,013
APPARATUS FOR REFLEX COPYING BY THE USE OF FIBER OPTICAL DEVICES
Filed Dec. 7, 1959  10 Sheets-Sheet 8

INVENTORS
CLIFFORD E. HERRICK, JR.
JOHN W. WEIGL
BY
ATTORNEYS

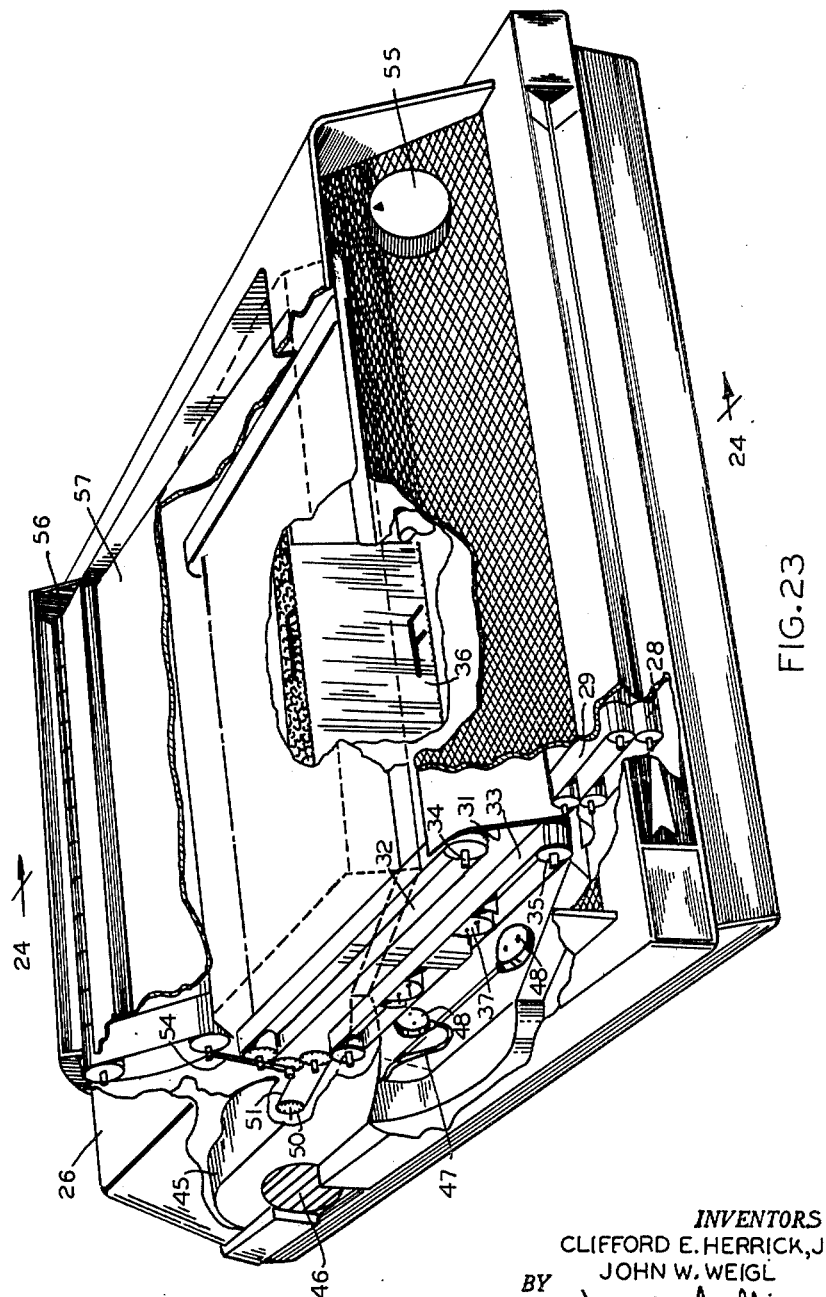

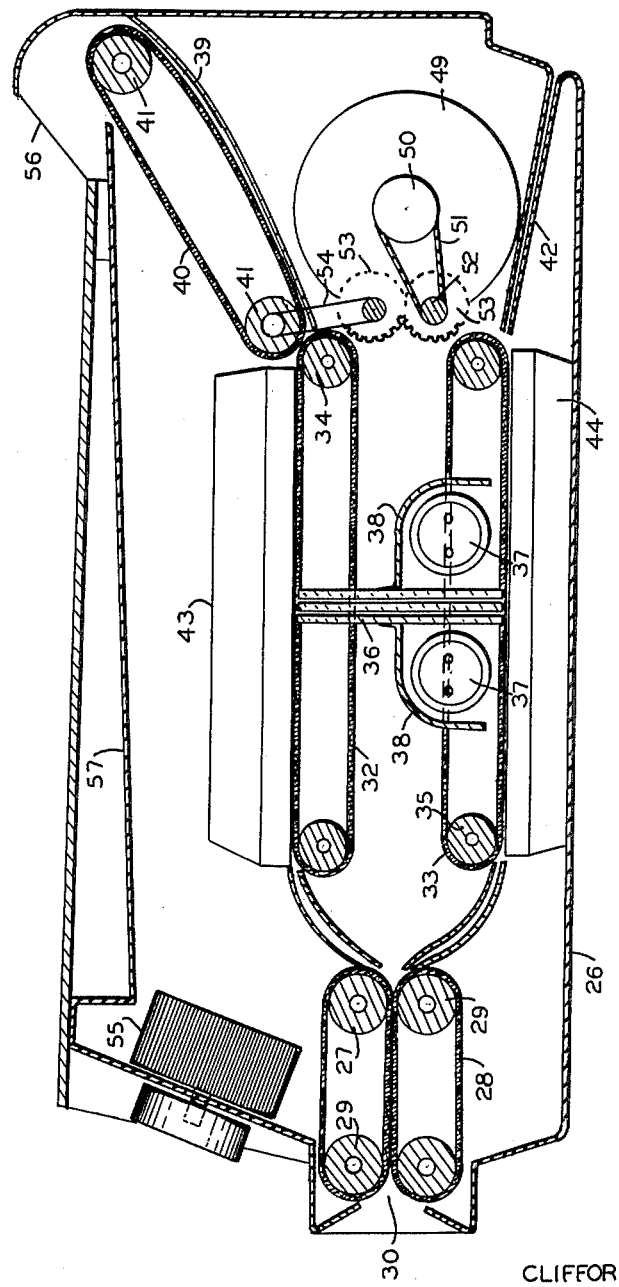

3,125,013
APPARATUS FOR REFLEX COPYING BY THE USE OF FIBER OPTICAL DEVICES
Clifford E. Herrick, Jr., Chenango Forks, and John W. Weigl, Binghamton, N.Y., assignors to General Aniline & Film Corporation, New York, N.Y., a corporation of Delaware
Filed Dec. 7, 1959, Ser. No. 857,963
7 Claims. (Cl. 95—75)

This invention relates to an apparatus for copying on photosensitive material by light reflected from the original, commonly known as the reflex process. More particularly this invention relates to such an apparatus wherein fiber optical devices are utilized for transmitting the light reflected by the original to the sensitized face of the photosensitive material.

The copying of transparent or translucent originals does not present any problem in modern copying technology and can be carried out with a variety of photosensitive materials. Among the various processes which can be used for such originals, dry diazotype process is outstanding since it operates without the use of other than gaseous chemicals and produces quickly a copy on film or paper and in almost any desired color. In addition to diazo, other photosensitive materials such as silver halide photoconductors can also be used. These latter have the drawbacks of either being wet or requiring the use of a toner powder which may be difficult to control and handle. Consequently in the realm of translucent or transparent originals, the diazotype process is commonly preferred.

However, many occasions arise when it is necessary to copy a document which is on opaque paper stock or which may have printing on both sides of the page. Under these circumstances copying can no longer be done by using light transmitted by the original; instead, light reflected by the original must be employed. Under these circumstances, it is desirable to employ a reflex printing method in which the original is overlaid with the light sensitive material and light is directed through the light-sensitive material onto the surface of the original and there modulated according to whether or not it strikes an image or non-image area. The light sensitive surface thus receives an additional increment of exposure, depending on whether or not the light was absorbed by printed or darker regions of the original.

A need exists for a means by which copies may be produced, using suitable diazo materials, from opaque originals or originals printed on both sides, and especially for a process in which all of the conveniences associated with reflex copying are retained, that is to say, highly efficient use of the available light is made and no lenses or other such refracting optical systems are required.

The disadvantage common to reflex copying is degradation of contrast because the illuminating light must pass through the copy on its way to the original, and this contrast degradation inevitably occurs unless the light sensitive material possesses sufficient photographic inertia. Further, another disadvantage common to all of these methods is the need for very precise adjustment of exposure conditions in order to achieve even a moderate degree of contrast.

It is accordingly an object of this invention to provide a reflex copying process and apparatus utilizing diazotype material which does not have the disadvantages of the prior art processes.

It is a further object of this invention to provide a reflex copying process and apparatus utilizing photosensitive material wherein the material is spaced from the original and wherein optical fibers are used to convey an image through space from near the surface of an opaque original to the sensitized face of the diazotype material.

It is a still further object of this invention to provide a reflex method of and apparatus for photo printing wherein substantially no contrast degradation due to incident illumination takes place.

Other objects and advantages of this invention will appear to those skilled in the art from the detailed description of the process given below.

The objects and advantages of our invention are accomplished by separating and spacing the sensitized material from the original and conveying the light reflected by the original to the sensitized face of the photosensitive sheet material by means of optical fibers, generally termed "fiber optics," which are placed in optical contact with original and copy sheet.

It is a particular feature of the invention that the original is illuminated laterally through or between the optical image fibers, so that the illumination need not pass through the overlying copy sheet.

By "fiber optics" we mean bundles of light-transmitting glassy or resinous rods, or fibers, preferably of high refractive index, which rods or fibers may, but need not be, each imbedded or sheathed by a transparent glass or resinous substance of lower refractive index in order to "insulate" them optically from their surroundings. It is well known that such bundles may be used to carry images of whatever light to which the glass or plastic material may be transparent. The physical principle responsible for light transmission in the fibers is the "total internal reflection" phenomenon used generally in "light pipes" and the like. In our invention, we may employ fibers ranging upward from a diameter of about 2 microns to a maximum diameter of 500 microns. The lower limit is set by the fact that the diameter of the fibers is approaching the wavelength of light and the rods begin to scatter light laterally due to diffraction effects, instead of transmitting it effectively. The upper limit is imposed by the resolution desired.

We have found that fiber optics as described above are especially suitable for conveying light from the original to the sensitized face of the photosensitive material. By the use of fiber optics we obtain better resolution and light transmittance, a sharper image and better contrast than can be obtained by any other known mode of conveying light, such as air, metal tubes, or the confined spaces between metal sheets, etc. such as disclosed in the patent to John, No. 2,198,115. In addition, we have discovered that twisted or folded fiber optical bundles are capable of producing "right-reading" reflex images on opaque copy sheets.

One of the salient features of the invention is the physical separation of object and image planes by the length of the optical fibers. We thereby provide space for the efficient introduction of illumination upon the face of the original, without needing to pass this light through the light sensitive sheet as was commonly done heretofore in reflex copying. We employ a variety of methods for using this space to transmit light to the surface of the original. For example, we illuminate by scattering light laterally through a solid array of image conveying fibers, or, more efficiently, by alternating 10 micron to 5 mm. thick illumination-conveying spacers with image-conveying fiber bands of comparable thickness. The illuminating spacers may be air, glass or plastic prisms, or preferably bands of optical fibers laid at an acute angle relative to the imaging fibers, so as to convey lateral illumination onto the original. These and other means will be described in greater detail below.

When the fibers and illuminating arrays are very thin and closely spaced, say, less than 50 microns in diameter and less than 50 microns apart, there is sufficient "throw" sidewise from the illuminating fibers so that good illumination appears beneath the imaging fibers. However, as larger and hence more efficient and easily handled fibers are used, it becomes desirable to provide a separation between the ends of the fiber array and the surface of the original being copied in order to secure full and efficient illumination of the image lying beneath the imaging fibers. Thus, we may separate the original from the proximate end of the fiber bundle by a thin space which may be air or a transparent spacer of glass, plastic, or the like, whose thickness is sufficient to enhance illumination adequately without causing excessive loss of resolution, and which may, but need not be, fused to the ends of the fibers. In practice we have found, for example, that a spacing of about 250 microns suffices for lateral illumination under thin bands of fiber optics 2.5 mm. wide, while still permitting a resolution of the order of 5 lines per millimeter. Other spacings may be used depending on the band thickness and the illumination and resolution desired.

We may, of course, employ a fiber optical device equal in size to the original, in which case both the original and copy may remain stationary during exposure. However, because of the difficulties of fabricating large-area fiber optical devices and especially because of the difficulty of introducing uniform lateral illumination through them, we find it advantageous to employ fiber arrays whose long dimension is commensurate with the narrower dimension of the original being copied and to scan the surface of the latter by traversing the fiber optical device across the surface of the original. The exact mode of operation will be apparent to those familiar with the "flow camera" and will be explained in detail in the examples. Thus, as just noted, in order to make practical use of narrow bands of fibers we cause them and their associated light sources to scan across the original and copy sheet at right angles to the narrow dimensions of the bands. Multiple bands with interspersed longitudinal light sources may be used to multiply the exposure per unit area obtained in a given time. An additional benefit arising from scanning the fiber optics across the image is an improvement of resolution, since any fiber pattern is thereby obliterated. On the other hand, the scanning requirement imposes a rather high standard of freedom from distortion in the overall device, because in scanning, excessive distortion leads to a blurring of the image.

The drawing illustrates the basic concepts of our invention and various modifications in which these concepts may be embodied.

In the drawing:

FIG. 5 is a view similar to FIG. 3 but showing the image-conveying fibers twisted and crossed in order to produce a mirror image reversal of the original on the sensitized face of the diazotype material.

FIG. 6 is a view of the crossed fiber optics taken at right angles to FIG. 5.

FIG. 7 is a cross-sectional view taken on line 7—7 FIG. 5.

FIG. 8 is a schematic view of a modified form of image-conveying fibers where these fibers are bent on themselves in order to produce a mirror image reversal of the original.

FIG. 9 is a schematic view at right angles to FIG. 8.

FIG. 10 is a schematic view of a device illustrating a modified form of our invention.

FIG. 11 is an end view of the device shown in FIG. 10.

FIG. 12 is an end view similar to FIG. 11 but showing the illuminating lamp positioned axially of the cylinder.

FIG. 15 is a perspective view of a modified form of a device utilizing a plurality of spaced fiber bundles.

FIG. 16 is a perspective view similar to FIG. 15 with parts broken away to show the inclination of the blocks used to conduct light from the light source to the original.

FIG. 17 is a detail view showing the construction of a form of light conducting block.

FIG. 18 is a view similar to FIG. 16 showing a modified form of lamp used as a source of light.

FIG. 19 is a detail view of a modified form of light block.

FIG. 20 is another detail view showing the lamp used in FIG. 18.

FIG. 23 is a perspective view of a machine which can be used to practice our invention.

FIG. 24 is a vertical section on line 24—24 FIG. 23.

Figure 1:
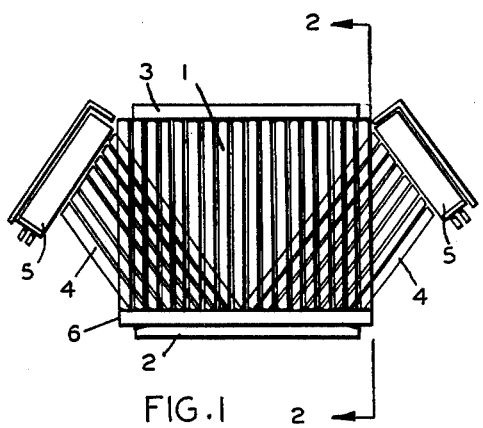
FIG. 1 is a schematic illustration of one mode of illuminating an original and conveying the light reflected thereby to the sensitized face of a diazotype material.
Figure 2:
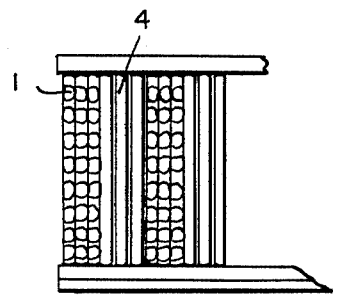
FIG. 2 is a section on line 2—2 FIG. 1.
Figure 4:
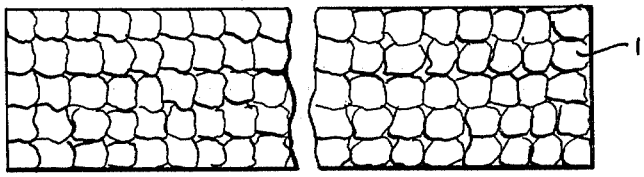
FIG. 4 is a section on line 4—4 FIG. 3.
Figure 3:
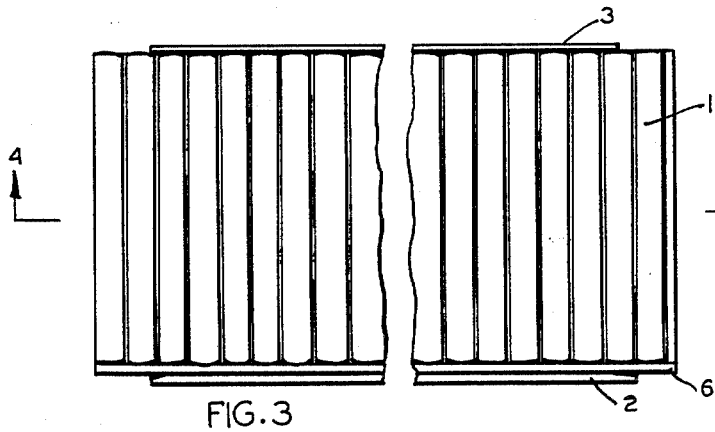
FIG. 3 is an enlarged view of the array of the image-conveying fibers.

In FIGS. 1, 2, 3 and 4, 1 designates a row of image-conveying fibers running between the original 2 and the light sensitive material 3. The original 2 is illuminated by interposing between certain rows of image conveying fibers 1 rows of fibers 4 laid at an acute angle to the rows of fibers 1 and running from a light source 5 to the immediate vicinity of the original 2. As shown in FIG. 1 the fibers 4 extend toward each other from opposite ends of the rows of the image conveying fibers 1 and two light sources 5 are provided. As best shown in FIG. 2 the fibers 4 are interposed between each third row of fibers 1. This arrangement, however, may be varied as desired. A transparent spacer 6 between the ends of the fibers and the original serves to throw light onto the portions of the original covered by the image-conveying fibers 1.

It is apparent from FIGURES 1 to 4 that an object will be seen in a normal un-reversed position when viewed through the fibers 1 and a transparent copy film 3. Consequently, an opaque copy made using this sort of fiber array, in which a sheet of sensitized pape 3 is laid emulsion side down and exposed in (flow) contact with the image end of the fibers 1, will be a typical reflex copy as produced by prior art methods in that when the exposed and developed copy is turned over and viewed, the letters are reversed. Such a copy must be read by transmitted light, i.e. by the use of a transparent film base, or else must be again recopied through the same device to produce a right-reading opaque copy. Transparent film is expensive and their very transparency makes theim difficult to read. The physical properties of fiber optics allow us, however, to construct a device which produces a mirror image reversal by causing crossed or folded fibers to exchange image elements in space thereby enabling us to use an opaque base such as paper, for example. Suitable schemes are illustrated in FIGURES 5, 6 and 7. Referring to FIGURE 2, it is clear that the band thickness, in this case three fibers, must be roughly equivalent to the "resolving power" desired. Thus an object, say about twice the size of the band thickness, could be copied. In order to secure a mirror image reversal, we twist each band thickness of image-conveying fibers 180° in the direction of scan. A 180° twisted array is shown in FIGURES 5, 6 and 7.

If the direction of scan is parallel to the dimension in which the fibers are crossed, the original and the copy sheet must move across the fiber optics equally fast but in opposite directions. If, on the other hand, the direction of scan is at right angles to the dimension in which the fibers are crossed, the original and the copy sheet must scan across the fiber optics equally fast and in the same direction. In either case, the fiber optics may be held still while the sheets are moved, or vice versa.

A little consideration will show that if the fiber reversion is carried out band by band, and if the original and the copy sheet are scanned past the fiber optics in the appropriate relative directions (as indicated above) a mirror image will be produced at the fiber ends and a right-reading image on the sensitive paper. This is an eminently useful thing to be able to do and we make much use of this scheme in practice. Flexible imaging bands can readily be twisted, and stacked, as illustrated in FIGURES 5, 6 and 7; if care is taken to see that the points of crossing occur at different points, the average thickness of each twisted band can be kept to only slightly more than double the thickness of the straight bands. In practice, means other than twisting are more attractive for securing band inversion and one of the preferred methods consists in simply folding each band back upon itself, as shown in FIGURES 8 and 9. In these figures 1″ represents the folded imaging bands.

FIGURES 5, 6 and 7 show a set of image-conveying fiber optics 1′ which have been twisted, a single-layer sheet at a time, by a 180° turn, and then assembled into a stack of twisted layers, separated by minimal feasible gaps 7. A and E represent the extreme dimensions of the fiber optics in the direction of fiber interchange. In FIGURE 6, the image of original element A is carried to A′, that of B to B′, . . . that of middle element C straight through to C′, . . . and finally that of E to E′.

The gaps 7 may be air, or glass, or plastic blocks for lateral illumination or they may contain diagonal or curved illuminating fibers. Suitable light sources are provided as in FIGS. 1 or 13.

The entire crossed-fiber optics assembly shown schematically in FIGURES 5, 6 and 7 may be scanned relative to the original and the copy sheet, parallel to the direction (A—E) of fiber interchange or perpendicular to this direction. In the former case, only a single band of crossed fibers may be used, for multiple bands would give multiple images. Furthermore, original and copy sheet must travel in opposite directions relative to the fiber band.

In the latter case (scan direction perpendicular to direction A—E), original and copy sheet should travel parallel to each other, and in the same direction. Alternatively, the fiber array may be caused to move between stationary original and copy sheets.

While we have thus far described the invention, for the sake of simplicity, as operating for an enlargement ratio of unity (one to one), it is equally possible to produce enlarged or reduced copies by the use of arrays of tapered or convergent fibers whose image plane is different in area from its object plane. Suitable arrangements can be made to traverse the original copy sheet at relative rates in proportion to the linear enlargement ratio.

The inventions described thus far are of great utility, in that they provide means for securing reflex copies which may be right reading even on opaque backings, using materials which are not adapted for systems of reflex copying in which the illumination must traverse the original. However, the basic systems described thus far put a high requirement on the precision with which the optical fibers must be aligned, since a slight distortion, which could be tolerated in a still exposure, contributes to loss of resolution or blurring in a scanning system. By fiber optical distortion we mean a failure of each fiber to terminate in the image plane in the same spatial relationship to its neighbors and the device as a whole as it does in the object plane. It is thus of interest to consider arrays in which reflex printing can be done in such a way that each fiber illuminates one and only one part of the original, so that a modest amount of fiber distortion can be tolerated.

In the modification shown in FIGS. 10 and 11 this object is attained by arraying fibers 1‴ diametrically across a transparent cylinder 8 which can be rotated about its axis 9. The original and copy sheets 2 and 3 are pressed against the cylinder 8 by moving belts (not shown) and are then moved by the cylinder in opposite directions at the same speed. The image is conveyed through the fibers 1‴ from original 2 to copy sheet 3, and is reversed in the process, so that, when the image ends of the fibers are viewed end-on, they present a mirror image of the original. Therefore, if an opaque copy sheet 3 is exposed by passage over the cylinder 8 with its photo-sensitive side in contact with the fibers 1‴ and then turned over and viewed in the normal fashion, it will bear a "right-reading" image. Illumination of the original 2 may be effectively provided, for example, by means of tubular light sources 10 set over the original close to the cylinder and parallel to the latter. Appropriate baffles 11 are required to prevent direct irradiation of the copy sheet 3. By suitably disposing the fiber cross points about the cylinder area, the effective axial thickness per fiber can be confined to about two fiber diameters.

We have also found it possible, as is shown in FIGURE 12, to mount a tubular lamp 12 axially within the cylinder 8 containing a fiber array, similar to that described above. A non-rotating reflecting baffle 13 behind the lamp 12 prevents direct illumination of the copy sheet 3, and illumination is directed between the fibers 1‴ onto the original 2. The image is carried back through the fibers onto the copy sheet. The effective surface aperture of this arrangement is limited by the cross-sectional area of the fibers to $1/\pi$, or about 0.32; that is at most only about ⅓ of the surface area of the cylinder can be used for imaging fibers, and this only when the diameter of the aperture left for the tubular lamp 12 is small compared to the radius. This is not entirely disadvantageous, however, since the remaining space can be used to introduce light from the axially located lamp 12. The image reversal properties of this system are identical to those of the laterally illuminated fiber optics roller described above.

In the fabrication of crossed-fiber optics, one may use any suitable weaving or stringing technique known in the glass fiber art. At present, we prefer to accomplish the sheet-by-sheet interchange of fiber ends by twisting individual single-layer uncemented parallel fiber bands by one half turn about their center (as shown in FIGURES 5 and 6), or by folding them, sheet by sheet (as shown in FIGURE 8). These twisted or folded sheets of image-conveying fibers are then stacked with or without intervening gaps.

Figure 13:
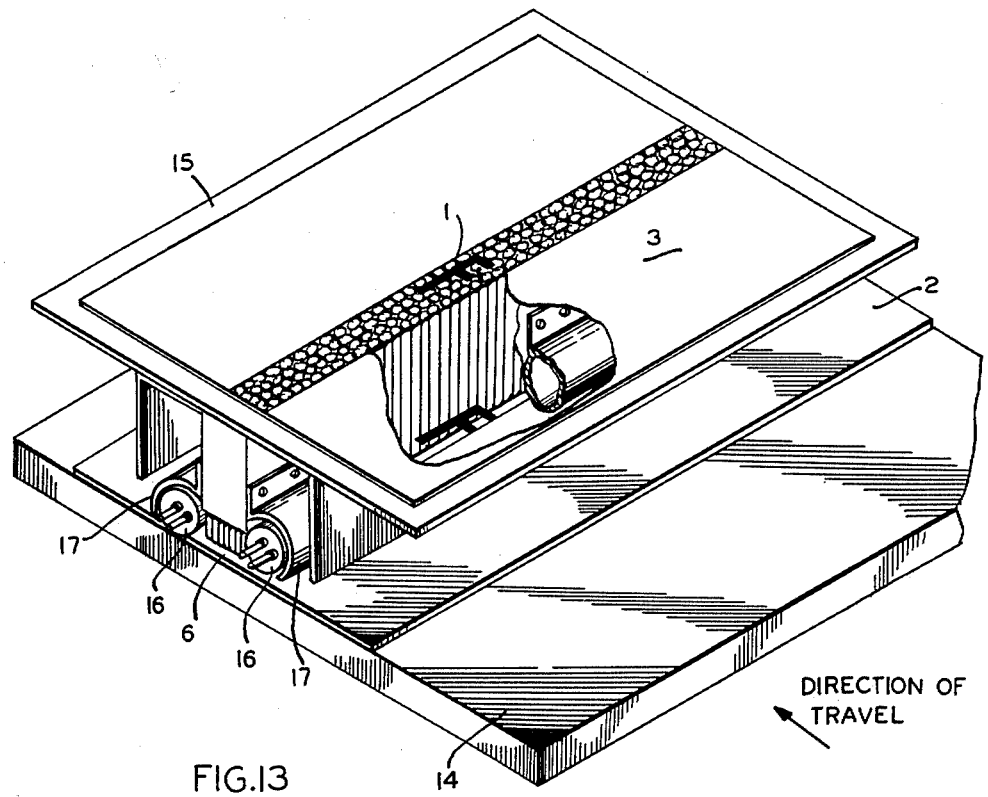
FIG. 13 is a perspective view of another device suitable for practicing our method.

In FIG. 13 we have illustrated a device which can be used to practice our novel process. In this figure, 14 is a support for supporting the original 2 and 15 is a frame which supports the copy film 3. The frame 15 may also support the fiber bundle 1 which is of substantially the same construction as that shown in FIGS. 1 to 4. Air cooled mercury arc lamps 16 of the same length as the fiber bundle are mounted parallel to fiber bundle 1 and close to the original 2. A transparent plastic spacer 6 similar to that already described is cemented in optical contact with the fiber bundle 1 and rests on the original 2. The spacer 6 may have a thickness of up to about 0.01 inch. The lamps 16 are partially covered with opaque baffles 17 to prevent the direct illumination of the copy film 3 by the lamps 16.

When it is desired to copy conventional 8½ x 11 inch letters or the like, the fiber bundle is made 8½ inches long, 0.2 inch wide with the individual fibers of the bundle about 1 inch long. The original and the copy film are then made to traverse the fiber bundle to scan the original. The traversing may be accomplished by moving the original and the copy film at substantially the same speed by suitable belts (not shown) while maintaining the fiber bundle and lamps stationary. The traversing may also be accomplished by moving the fiber bundle and the lamp while maintaining the original and copy film stationary. We prefer to maintain the fiber bundle stationary while moving the original and copy film.

In making a copy of a conventional 8½ x 11 inch letter the original is placed under the fiber bundle so that the fiber bundle extends across the full width of the original that is, the 8½ inch dimension, the copy film is placed on top of the bundle. The original and the copy film are then moved by any suitable means such as belts (not shown), for example, across the fiber bundle in the direction of the length of the original, that is, the 11 inch dimension. The copy film is preferably transparent so that the image is right reading from the back or unsensitized face of the film. The image produced on the sensitized face is a mirror image.

If insufficient exposure is achieved by these means, at the desired rate of traversal, the exposure may be multiplied at will by providing multiple units constructed of alternating narrow fiber blocks 1 and narrow lamps 16 with their reflectors 17.

Figure 14:
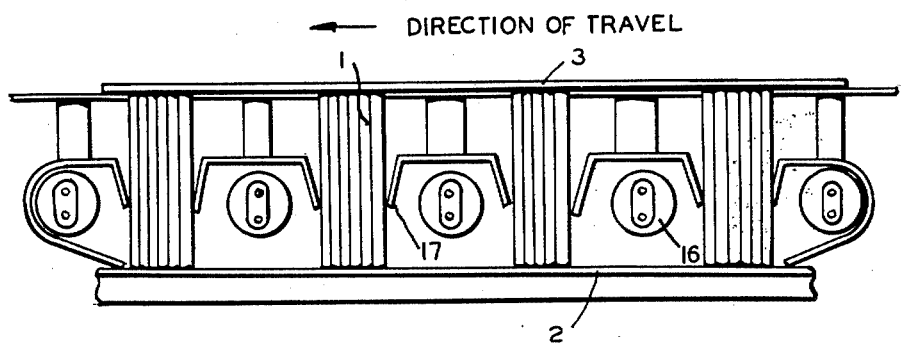
FIG. 14 is a schematic view of a device utilizing a plurality of spaced fiber bundles and lamps.

FIGURE 14 indicates such an arrangement schematically. The individual fiber bundles and lamps are similar to those shown in FIG. 13. It is desirable, of course, that the alternating fiber optics bands 1 and lamps 16 be aligned with their long dimensions approximately perpendicular to the direction of paper travel (see arrow).

FIGURE 15 shows a simplified scheme for conveying light down onto an original 2 from laterally placed baffled tubular lamps 16, through narorw gaps 18 between fiber bands 1 without directly illuminating the copy sheet 3, which is placed above and in optical contact with the image-conveying fiber optics 1 and a suitable supporting frame 19. A thin spacer 6 is preferably provided between fibers and original in order to permit effective illumination of the latter. It is necessary to scan the original by traversing the fiber optics between original and copy film with a relative motion normal to the longest dimension of the fiber band. The gaps 18 may be simply air spaces, or they may be filled with transparent glass, quartz, or resin blocks 20. If such blocks are used, their sides are preferably serrated or slanted to minimize reflection losses. Such serrations are shown in profile at 21 in FIGURES 17, 18 and 19. When such blocks are used in the gaps, it is preferable to slant or curve them downwards diagonally as shown at 22 in FIGURES 16, 18 and 19 so that they may reflect additional illumination towards the center of the original 2. To this end, the slanted surfaces may even be metallized, if necessary, to improve their internal reflection of light. Such a reflective coating is shown at 23 FIG. 19. In designs embodying glass, quartz or resinous blocks in the gaps 18 we find it advantageous to recess these blocks somewhat behind the ends of the fiber bundles facing the original 2 to be illuminated.

FIGURES 18, 19 and 20 show a similar device but in which short vertical arcs 24 (i.e. arcs set approximately parallel to the glass fibers 1) are placed at the lateral edges of the spacers or blocks 20 between successive fiber bands, as well as in front of and behind them. Here a much larger fraction of the luminous flux reaches the original than in FIG. 15 since in the case of FIG. 15 a large portion of the light is back scattered from the lateral edges of the fiber bundles themselves. Otherwise the modification shown in FIGS. 18, 19 and 20 is the same as that shown in FIGS. 15, 16 and 17.

Figure 22:
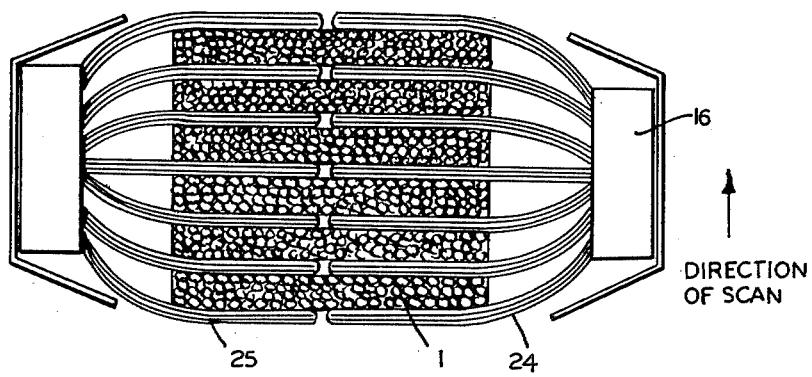
FIG. 22 is a plan view of FIG. 21.
Figure 21:
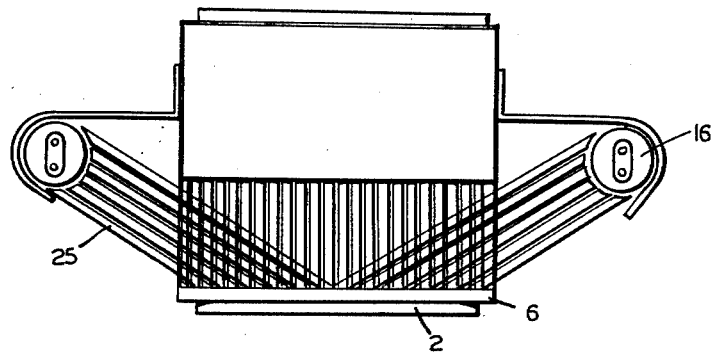
FIG. 21 is a schematic view in vertical section of still another form of a light conducting arrangement used to conduct light from the light source to the original and from the original to the diazotype material.

FIGURES 21 and 22 illustrate a novel and efficient means for conducting illuminating light onto the original. In this device, the gaps between successive bands 1 of image-conveying fiber optics are filled with bands 25 of diagonal or curved fiber optics which carry illumination from the laterally placed lamp or lamps to the original. The ends of these fiber bundles nearest the original 2 are preferably slightly recessed and individually rounded in order to increase the lateral diffusion of light onto those portions of the original 2 which lie under the image-conveying fiber optics 1.

It is further advantageous, but not necessary, to use illuminating fibers 25 which are each tapered, so as to present smaller cross-sections to the original 2 than to the light source 16 which light source is similar to that shown in FIG. 13. This increases the lateral diffusion of the illumination out of these fibers 25 onto the portions of the original covered by the image-conveying fiber optics 1. It is of even further advantage to simultaneously taper the image-conveying fibers 1 in an opposite direction—i.e., so as to taper to a reduced cross-section towards the copy sheet 3. This not only serves to fill the volume of the fiber optics more neatly, but also helps to minimize the lateral pickup of stray light by the image-conveying fibers 1 by reducing their "light acceptance angle." Any type of light source may be used to illuminate the diagonal or curved illuminating fiber bundles 25. However, these latter lend themselves to a novel, and particularly effective geometrical arrangement, capable of capturing directly a large fraction of the illumination available from the light source. FIGURES 21 and 22 show how bright arc lamps 16 with suitable reflectors 17 may be placed laterally at the outer edges of the image-conveying fiber optics 1, so as to lie parallel to the direction of scanning and normal to the long direction of the fiber bands 1. The illuminating fibers 25 are brought together close to the surface of the arcs 16, so as to capture as large a fraction of their emitted light as possible. These fibers 25 are then fanned out horizontally and vertically, so as to convey thin bands of light between the narrow bands of image-conveying fiber bundles 1. This provides a most effective means for the conveyance of nearly all of the arc light to the original 2. Since it is possible to make the alternating bands of illuminating and image-conveying fibers quite narrow, even to the point of using few or single fiber layers in each type of band, only a very thin spacer 6 over the original suffices for adequate lateral illumination of the original 2. This results in improved image resolution on the copy foil 3. An enlarged view of both sets of fibers is shown in FIGURE 1.

A device of this sort is made preferably as a single rigid unit by fusnig or cementing alternate layers of vertical and diagonal or curved fibers 1 and 25 respectively. The means for accomplishing this construction are known in the fiber optics art. The unit is preferably traversed, relative to original and copy sheet, in the manner described in connection with FIG. 6. However, if a sufficiently large block of alternate mono- (or nearly mono-) layers of illuminating and imaging fibers are made, it may suffice to make a static exposure under such a block without scanning.

It will be clear to shose skilled in the art that it is most efficient to use a relatively larger cross-section of image-conveying fibers than of illuminating fibers—provided a maximal fraction of the light available from the lamps can be caused to impinge on the original through the illuminating fibers used. There is a practical optimum ratio of fiber cross-sections which is of the order of 2:1 image fibers: illuminating fibers.

Our process is especially designed for use with light-sensitive diazo material. However, silver halide-sensitized film or film sensitized with a photopolymerizable resinous material, such as a polymerizable vinyl compound, as disclosed in Patent No. 2,875,047 to Oster, for example, may also be used. The resulting positive or negative image may be developed in a separate developing operation utilizing for this purpose any means known in the art which is suitable for the particular type of sensitized layer used in the process. The resulting developed film may be used for direct viewing, as an original for projection or reprinting, or for any other suitable purpose.

The long transverse lamps described above, may be replaced by other means of lateral illumination. For example, suitable light sources may be placed adjacent to the short sides of a series of fiber bands so that illuminating light is carried laterally to the original between the bands without first striking the copy sheet. Around the spacers the fiber bands are preferably covered with an opaque paint or baffle to minimize the entry of stray light into the image-conveying fibers. We have found, however, that light impinging upon fiber bundles from the sides at a reasonably acute angle does not seriously degrade contrast and is, on the contrary, useful for illumination of the original.

Suitable light sources include:

(1) Tubular sources placed parallel to the direction of scan.

(2) Short-arc or incandescent sources placed parallel to the fiber direction in the fiber optics and interspaced between, before, and behind alternate bands of fiber optics.

Suitable materials for the illumination gaps include:

(1) Illumination-carrying air spaces.

(2) Illumination-carrying plastic, glass or quartz spacers.

(3) Illumination-carrying diagonal or curved bands of fiber optics.

In FIGS. 23 and 24 we have illustrated a novel machine which may be used commercially to carry out our novel method.

It comprises a housing 26 which encloses the various operating parts. Within the housing and at one end thereof there are positioned upper and lower relatively short conveyor belts 27 and 28 mounted on suitable rollers 29 to be driven thereby. The housing has a slot or opening 30 in alignment with the space between the belts through which the copy film and original may be introduced in superposed relation between the belts 27 and 28 and conveyed inwardly thereby. A deflector and guide member 31 having a sharp end is positioned centrally in the bight between the inner rollers 29 of the upper and lower belt. As the copy film and the original are moved inwardly they are separated by the sharp end of member 31 and are guided thereby in opposite directions upwardly and downwardly toward vertically and horizontally spaced movable belts 32 and 33. There are two upper belts 32 which are aligned and horizontally spaced from each other and two lower belts 33 which are aligned and horizontally spaced from each other, the upper and lower belts being in substantial alignment with each other vertically. The belts 32 are mounted on rollers 34 and the belts 33 are mounted on rollers 35 to be driven thereby.

Vertically positioned in the space between the belts 32 and 33 is a fixed fiber optic device 36. The fiber optic device 36 may be of any suitable type already described such as, for example, the fiber optic device 1 shown in FIG. 13. The upper end of the device 36 is flush with the upper surfaces of belts 32 and the lower end of device 36 is flush with the lower surfaces of belts 33. Elongated lamps 37 are positioned adjacent the lower end of the device 36 one on each side thereof. These lamps are provided with reflecting baffles 38 positioned to prevent the direct illumination of the copy film being conveyed by the upper belts 32. The lamps 38 illuminate the original being conveyed by lower belts 33.

Positioned adjacent the exit ends of belts 32 and extending across the space between these belts is a guide member 39 having the inner end thereof flush with the upper surfaces of both belts 32. This guide member 39 receives the exposed copy film as it leaves the belts 32 and guides it out of the machine. Spaced belts 40 mounted on rollers 41 are positioned adjacent the upper surface of guide members 39 one adjacent each of said belts 32 to move the copy film along the guide member after it leaves the belts 32.

A downwardly inclined guide slot 42 having one end adjacent the exit ends of lower belts 33 extends across the space between the belts and receives the original as it leaves belts 33. The original moves through the slot to the outside of the housing.

A vacuum chamber 43 covered by a perforated plate is positioned immediately above the belts 32 and spans the space between them for the purpose of maintaining the copy film flat during its movement past the fiber optics device 36. Another vacuum chamber 44 is positioned immediately below the belts 33 and spans the space between them for maintaining the original flat during its movement pas the fiber optics device 36.

Means are provided for cooling the machine. This means comprises a fan 45 having an intake 46. The fan forces cooling air through ducts 47 and nozzles 48 (FIG. 23) to cool the machine.

A motor 49 drives the various movable parts of the machine such as the fan and the belts. The motor shaft is provided with a pulley 50 driving by means of belt 51 a shaft 52, which in turn drives rollers 34 and 35 of belts 32 and 33 through the medium of a train of gears 53. The belts 40 are driven by chains 54 which in turn are driven by said train of gears 53. Similar chains and gears (not shown) are provided for driving belts 27 and 28. The motor is controlled by a speed control switch 55.

In operation, an original and a copy film are superposed in face to face relationship and inserted through slot 30 into the bight between the belts 27 and 28 and are conveyed by the belts to deflector and guide member 31 where the copy film is separated from the original and the two are guided in opposite directions by the guide member, the copy film being guided onto upper belts 32 and the original being guided onto lower belts 33. The belts 32 and 33 are sufficiently narrow to engage only the side edges of the copy film and the original. The film and the original between the belts are maintained flat by means of vacuum chambers 43 and 44 respectively.

The film and original are continuously conveyed by the belts past the fiber optics scanning device 36 positioned between the belts, the original being illuminated by lamps 37 as it moves past the scanning device and the light reflected from the original is conveyed by the fiber optics device to the sensitized face of the copy film. The thus exposed copy film is moved by the belts 32 to guide element 39 where the edges of the film are engaged by belts 40 and moved along the guide element through slot 56 and onto a receiving tray 57 formed on top of the housing where it may be temporarily stored, if desired. The original after passing the scanning device is moved by belts 33 into slot 42 and out of the housing.

While we have described in detail a machine by which our method may be conveniently carried out, many modifications thereof will occur to a person skilled in the art. Thus, instead of a single slot for introducing both the original and copy film into the housing, two separate slots may be provided and the original and copy film placed directly on belts 32 and 33 thereby dispensing with belts 27 and 28 and deflector and guide element 31. The scanning device and lamps 36, 37, 38 may be replaced by any one of the scanning and illuminating devices described in connection with FIGURES 1 to 22 provided proper relative directions of original and copy sheets are maintained. We do not, therefore, intend to be limited in the patent granted to the exact method and apparatus described herein. Our invention includes all modifications that fall within the scope of the appended claims.

We claim:

1. In a photocopy apparatus utilizing light reflected from an original to be copied, means for supporting said original and said light-sensitive copy material in spaced relation from each other, a first set of fiber optical elements arranged between said original and said copy material for conveying light reflected from the latter and a second set of fiber optical elements interspersed among said first set for conveying light to said original and a light source for illuminating said second set of elements.

2. Apparatus in accordance with claim 1 wherein said first set of fiber optical elements are substantially perpendicular to said original and said copy material and said second set of elements are placed at an acute angle.

3. Apparatus in accordance with claim 1 where certain of said first set of fiber optical elements are twisted at 180° in a lateral plane for correcting the mirror effect of light transmission.

4. A reflex copying apparatus as recited in claim 1 wherein one dimensino of said fiber optic device is smaller than a dimension of said original and of said copy sheet and means are provided for moving said original and copy sheet in unison relative to the fiber optic device whereby to scan the original.

5. A reflex copying apparatus as recited in claim 1 wherein said fiber optic device comprises a plurality of fiber bundles arranged in a row transverse to the original and copy sheet, certain of the fiber bundles in each row being twisted through an angle of 180° and crossed with other fiber bundles in said row in such a manner as to produce a right reading image of the original on the light sensitive face of the copy sheet.

6. A reflex copying apparatus as recited in claim 1 including means for relatively moving the original and copy sheet and fiber optic device in a direction parallel to the dimension in which the fibers are twisted to scan the original.

7. A reflex copying apparatus as recited in claim 1 including means for relatively moving the original, copy sheet and fiber optic device in a direction perpendicular to the dimension in which the fibers are twisted to scan the original.

References Cited in the file of this patent

UNITED STATES PATENTS

| | | |
|---|---|---|
| 1,751,584 | Hansel | Mar. 25, 1930 |
| 1,848,814 | Allen | Mar. 8, 1932 |
| 1,896,246 | Owens | Feb. 7, 1933 |
| 2,198,115 | John | Apr. 23, 1940 |
| 2,295,632 | Buskes | Sept. 15, 1942 |
| 2,311,547 | Hutchinson | Feb. 16, 1943 |
| 2,825,260 | Obrien | Mar. 4, 1958 |

FOREIGN PATENTS

| | | |
|---|---|---|
| 285,738 | Great Britain | Feb. 15, 1928 |